United States Patent [19]

Benchaar et al.

[11] Patent Number: 5,153,976
[45] Date of Patent: Oct. 13, 1992

[54] BALL-AND-SOCKET ASSEMBLY AND METHOD OF MAKING

[75] Inventors: Mohamed L. Benchaar; Larry E. Isakson, both of Mishawaka; Daniel A. Mauro, South Bend, all of Ind.

[73] Assignee: Allied-Signal Inc., Morristown, N.J.

[21] Appl. No.: 856,316

[22] Filed: Mar. 23, 1992

[51] Int. Cl.$^5$ .................. B23P 11/00; F16C 11/06
[52] U.S. Cl. .................... 29/436; 29/441.1; 29/451; 29/453; 403/122; 403/135; 403/144
[58] Field of Search ............. 29/434, 436, 437, 441.1, 29/443, 450, 451, 453; 403/122, 123, 125, 128, 132, 135, 141, 144, 90, 92, 93, 96, 97, 143

[56] References Cited

U.S. PATENT DOCUMENTS

| | | | |
|---|---|---|---|
| 769,248 | 9/1904 | Brainard . | |
| 1,294,538 | 2/1919 | Rose . | |
| 2,856,250 | 10/1958 | Thoma | 403/144 X |
| 3,173,344 | 3/1965 | Mongitore | 92/187 |
| 3,192,868 | 7/1965 | Wahlmark | 103/162 |
| 3,787,128 | 1/1974 | Maistrelli | 403/135 |
| 3,862,807 | 1/1975 | Doden et al. | 403/144 X |
| 4,004,771 | 1/1977 | Plevak et al. | 248/357 |
| 4,410,295 | 10/1983 | Ersoy et al. | 403/122 |
| 4,515,336 | 5/1985 | Fischer | 248/288.3 |
| 4,666,330 | 5/1987 | O'Connell | 403/143 |
| 4,679,958 | 7/1987 | Mizusawa et al. | 403/122 X |
| 4,764,048 | 8/1988 | Kehl et al. | 403/11 |
| 4,905,577 | 3/1990 | Schneeweiss | 92/158 |
| 4,966,488 | 10/1990 | Mayhew | 403/135 |

Primary Examiner—Timothy V. Eley
Attorney, Agent, or Firm—Larry J. Palguta; Ken C. Decker

[57] ABSTRACT

The ball-and-socket assembly (10) comprises a rod (12) having a ball head (14) at one end thereof, the ball head (14) having a diametrical groove (16) with a flexible member (30) disposed therein and extending radially beyond the outer surface (14A) of the ball head (14). A body (44) includes a bore (46) having a flared entrance wall (50) communicating with an open end (48) of the bore (46), the flared entrance wall (50) extending axially inwardly to a radial shoulder (52) defined between end of the flared entrance wall (50) and a large diameter portion (54) of the bore (46), a small diameter portion (58) of the bore (46) being located axially inwardly of the bore (46) relative to the large diameter portion (54), and a frustoconical wall (56) extending between the small and large diameter portions (54, 58). The ball head (14) and flexible member (30) are located within the bore (46) such that the portion (30B) of the flexible member (30) extending beyond the surface (14A) of the ball head (14) is engageable with the shoulder (52) in order to capture the head (14) within the bore (46). Pivoting of the rod (12) relative to the bore (46) causes the flexible member (30) to move diametrically relative to the ball head (14) as a result of engagement with the frustoconical wall (56), and ensures that the ball head (14) remains trapped securely within the bore (46).

7 Claims, 1 Drawing Sheet

BALL-AND-SOCKET ASSEMBLY AND METHOD OF MAKING

The present invention relates generally to a ball-and-socket assembly, and in particular to an exceptionally strong ball-and-socket assembly which prevents the ball from being removed from the socket.

It is typical for ball-and-socket assemblies to be assembled in a manufacturing plant where various types of machinery are available to perform operations such as a crimping of the socket containing member around the ball head. In one application, a ball-and-socket connection is utilized between a hydraulic brake booster assembly and a rod attached to the brake pedal of the vehicle. The ball head of the brake pedal rod is typically inserted into the socket, which may be made of plastic or other materials, and then the socket containing member is crimped by a machine so that the ball head is captured within the socket. However, it is sometimes necessary that the brake pedal rod be attached to the hydraulic brake booster in the field where such machinery is not available. Thus, a ball-and-socket assembly is highly desirable which can be assembled with equal ease both in a factory and in the field. It is necessary that the assembly be accomplished without the utilization of any machinery, with the utilization of perhaps only hand tools, and that the ball-and-socket assembly provide an exceptionally strong coupling so that the brake pedal rod is essentially attached permanently to the hydraulic brake booster assembly.

The present invention provides solutions to the above problem by providing a ball-and-socket assembly, comprising a body having therein a multidiameter bore, the multidiameter bore comprising a flared entrance wall communicating with an open end of the body, a shoulder defined by an end of the flared entrance wall and a large diameter portion of the bore, a small diameter portion located axially interiorly of the bore relative to the large diameter portion, the small diameter and large diameter portions of the bore connected by a frustoconical wall extending radially outwardly in an axial direction corresponding to an axial direction of radial extension of the flared entrance wall, a rod having a ball head thereon, the ball head including a groove thereabout, and a flexible member disposed within said groove and extending radially outwardly therefrom and beyond the shoulder, the flexible member movable diametrically, relative to the ball head, by engagement with the frustoconical wall as the rod is pivoted.

One way of carrying out the invention is described in detail below with reference to the drawings which illustrate an embodiment in which.

Figure 1:
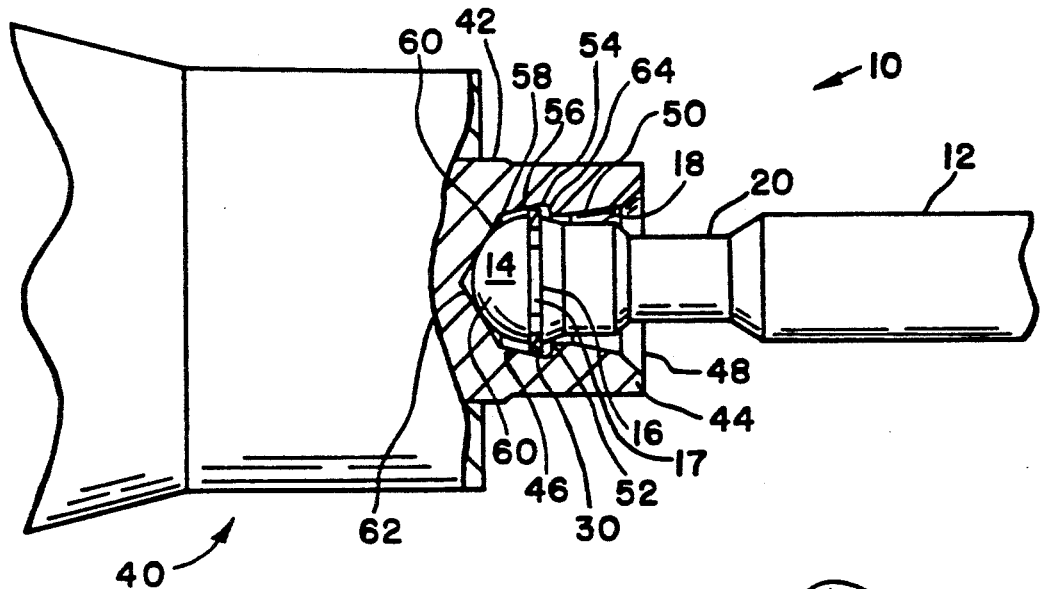
FIG. 1 is a section view of the ball-and-socket assembly of the present invention.
Figure 2:
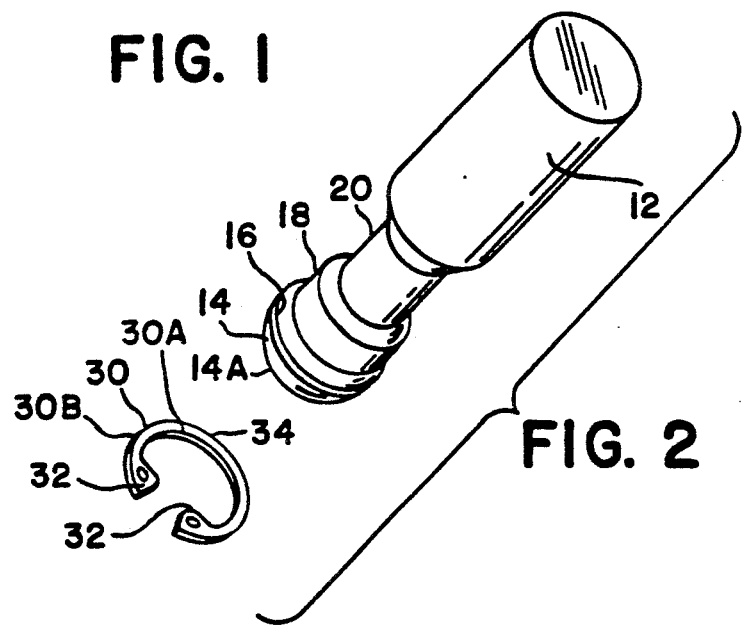
FIG. 2 is an isometric view of the rod and flexible circlip.

The ball-and-socket assembly of the present invention is designated generally by reference numeral 10 in FIG. 1. Assembly 10 includes brake pedal rod 12 which extends to ball or ball head 14 having therein a diametrical groove 16, and ball head 14 extends from enlarged diameter rod portion 18 located adjacent narrow diameter rod portion 20. Located within groove 16 is groove bottom 17 surrounded by flexible member or circlip 30 having ends 32 (see FIG. 2) and circumferential portion 34. A hydraulic brake booster in FIG. 1 is designated generally by reference numeral 40 and includes rear member 42 constituting body 44 with axial multidiameter bore 46 located therein. Axial multidiameter bore 46 comprises open end 48 communicating with a flared entrance wall 50, and radial shoulder 52 defined between an end of flared entrance wall 50 and large diameter portion 54 of bore 46. Bore 46 includes small diameter portion 58 located axially interiorly of the bore relative to large diameter portion 54, and frustoconical wall 56 extending between small diameter portion 58 and large diameter portion 54. Frustoconical wall 56 extends radially outwardly as the wall proceeds axially from small diameter portion 58 toward large diameter portion 54. Bore 46 comprises a blind bore having radially sloped end surfaces 60 merging at bore bottom 62. Large diameter portion 54 is located at curved corner 64 which extends between the large diameter portion 54 and radial shoulder 52.

Ball-and-socket assembly 10 is assembled according to the following procedure. Flexible member or circlip 30 is moved laterally into groove 16 such that the circlip ends 32 expand radially outwardly as they contact groove bottom 17 and then snap or retract radially inwardly of groove 16. Circlip 30 is located such that radially inward portion 30A is located within groove 16 while radially outward portion 30B is located radially outwardly of surface 14A of ball head 14. The subassembly comprising rod 12 and circlip 30 is then inserted axially into bore 46 so that as ball head 14 moves axially past flared entrance wall 50 of the bore, the flared entrance wall forces flexible circlip 30 radially inwardly so that ends 32 approach each other as the circlip compresses inwardly of groove 16. As circlip 30 is moved axially by head 14 and passes radial shoulder 52, the circlip rebounds resiliently outwardly to assume its normal at-rest position as illustrated in FIG. 1. Surface 14A of ball head 14 will bottom on radially sloped surfaces 60 and the ball head will be trapped within bore 46 as a result of the radially outward portion 30B of circlip 30 engaging shoulder 52 when rod 12 is moved axially away from bore 46.

Figure 3:
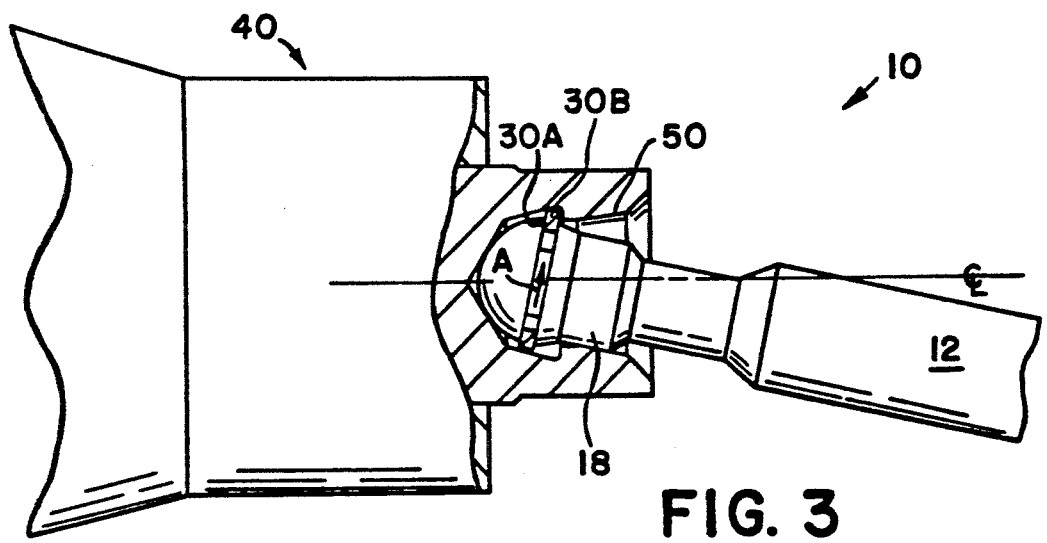
FIG. 3 is an illustration of the ball-and-socket assembly when the rod is pivoted relative to an axial centerline of the assembly.

When rod 12 is pivoted as illustrated in FIG. 3, large diameter portion 18 of rod 12 and entrance wall 50 define the limit of rotation or maximum angle to which rod 12 can be pivoted relative to the illustrated centerline of the assembly. As rod 12 pivots, the portion of circlip 30 which is located adjacent the side of rod 12 approaching flared entrance wall 50 engages frustoconical wall 56 such that circlip 30 is forced radially into groove 16 in the direction of arrow A and the opposite side of circlip 30 moves radially outwardly relative to the groove. The result is that the radially outward portion 30B of circlip 30 which has been moved radially outwardly continues to be adjacent frustoconical wall 56 and will engage radial shoulder 52 if the rod should be moved outwardly of the bore. This effectively prevents ball head 14 from being pulled from bore 46 despite the pivoting of rod 12.

The ball-and-socket assembly of the present invention provides an exceptionally strong coupling between the pedal rod and hydraulic brake booster. The pull out force required to remove ball head 14 from bore 46 is at least three times greater than that present in prior assemblies, such that in effect a permanent ball-and-socket assembly has been provided. Additionally, and equally important, is the easy assembly of the ball-and-socket assembly in the field without the requirement of machinery normally present in a manufacturing plant. As a result, the ball-and-socket assembly utilized between the brake pedal rod and a hydraulic booster of a vehicle can be assembled easily in either the factory or in the field with a minimal utilization of hand tools and without the requirement of any machinery. The ball-and-socket assembly provides a high strength permanent coupling highly desirable for a brake pedal rod coupled with a hydraulic brake booster.

We claim:

1. A method of assembling a ball-and-socket assembly, wherein the ball is located at an end of a rod and includes a diametrical groove within the ball, the socket comprises a bore within a body and includes a flared entrance wall communicating with an end opening of the body, the flared entrance wall defining at one end a shoulder located between the flared entrance wall and a large diameter portion of the bore, a small diameter portion of the bore located axially interiorly of the bore relative to the large diameter portion, and a frustoconical wall portion extending between said small and large diameter portions, comprising the steps of displacing a flexible member laterally into the groove of the ball such that the flexible member substantially surrounds a bottom of the groove and has a circumferential portion located partly in the groove, inserting axially the ball into the bore such that the flared entrance wall compresses the flexible member further into the groove, and continuing to insert the ball axially into the bore until the flexible member passes axially the shoulder and expands radially outwardly at the large diameter portion of the bore and thereby captures the ball within the bore.

2. The method of claim 1, wherein the flexible member is free to move diametrically relative to the ball as the rod is moved relative to the socket.

3. A ball-and-socket assembly, comprising a body having therein a multidiameter bore, the multidiameter bore comprising a flared entrance wall communicating with an open end of the body, a shoulder defined by an end of the flared entrance wall and a large diameter portion of the bore, a small diameter portion located axially interiorly of the bore relative to the large diameter portion, the small diameter and large diameter portions of the bore connected by a frustoconical wall extending radially outwardly in an axial direction corresponding to an axial direction of radial extension of the flared entrance wall, a rod having a ball head thereon, the ball head including a groove thereabout, and a flexible member disposed within said groove and extending radially outwardly therefrom and beyond the shoulder, the flexible member movable diametrically, relative to the ball head, by engagement with the frustoconical wall as the rod is pivoted.

4. The ball-and-socket assembly in accordance with claim 3, wherein the bore comprises a blind bore and the ball head engages radially sloped surfaces defining a bottom of said bore.

5. The ball-and-socket assembly in accordance with claim 4, wherein the rod includes a large diameter portion having a diameter slightly less than the diameter of the ball such that the large diameter portion of the rod and flared entrance wall define a restricted limit of pivotal movement of the rod.

6. The ball-and-socket assembly in accordance with claim 5, wherein the ball is permanently captured within the bore by means of the flexible member being engagable with the shoulder to prevent removal of the ball head from the bore when the rod is moved axially away from the bore.

7. The ball-and-socket assembly in accordance with claim 1, wherein the large diameter portion comprises a curved corner located where the frustoconical wall merges into a radially inward extending portion defining a radial side wall of the shoulder.

* * * * *